United States Patent [19]

Holmes

[11] Patent Number: 4,734,002
[45] Date of Patent: Mar. 29, 1988

[54] LOCKING THREAD FORM FOR MALE FASTENER

[76] Inventor: Horace D. Holmes, 28576 Green Willow, Farmington Hills, Mich. 48024

[21] Appl. No.: 884,791

[22] Filed: Jul. 11, 1986

[51] Int. Cl.⁴ ............................................. F16B 39/30
[52] U.S. Cl. .................................. 411/311; 411/938
[58] Field of Search ............ 411/259, 263, 264, 307, 411/308, 309, 310, 311, 333, 334, 411, 436, 929, 938

[56] References Cited

U.S. PATENT DOCUMENTS

| | | | |
|---|---|---|---|
| 1,798,604 | 3/1931 | Hoke | 411/929 X |
| 1,828,856 | 10/1931 | Bridges | 411/308 X |
| 1,946,860 | 2/1934 | Kielland | 411/929 X |
| 2,091,788 | 8/1937 | McManus | 411/929 X |
| 2,301,181 | 11/1942 | Ilsemann | 411/309 |
| 3,323,402 | 6/1967 | Gowen et al. | 411/411 |
| 3,433,117 | 3/1969 | Gowen et al. | 411/411 |
| 3,721,283 | 3/1973 | Evans | 411/938 |
| 4,341,497 | 7/1982 | Downey | 411/311 |
| 4,351,626 | 9/1982 | Holmes | 411/311 |
| 4,432,682 | 2/1984 | McKewan | 411/311 |

FOREIGN PATENT DOCUMENTS 335598  9/1930  United Kingdom ............... 411/311

*Primary Examiner*—Neill Wilson
*Attorney, Agent, or Firm*—Krass & Young

[57] ABSTRACT

A self-locking fastener combination including a standard female fastener element and a nonstandard male fastener element. The external threadform of the male fastener is characterized by an asymmetric flank angle arrangement and a step at the bolt threadform valley defined by an elevated portion which is of greater than nominal diameter and an adjacent depressed portion which may be of lesser than nominal diameter.

4 Claims, 2 Drawing Figures

LOCKING THREAD FORM FOR MALE FASTENER

FIELD OF THE INVENTION

This invention relates to threaded fasteners and particularly to male threaded fasteners such as bolts having an external thread form which yields an essentially vibration-proof fastener with class two or better mating threads.

BACKGROUND OF THE INVENTION

A great many contributions have been made over the years to the art of threaded fasteners in an effort to produce a fastener combination which will prohibit loosening in an application which produces vibration. Many of these fastener designs are based on the concept that interference between the male and female threadforms will produce additional friction to resist rotation in a direction which de-tensions the fastener in its applied condition.

Many of these prior art thread forms are of interest from a scientific standpoint and can be manufactured under laboratory or near laboratory conditions to actually perform their intended functions. However, these threadforms cannot, for the most part, be manufactured in mass production quantities and remain operable in randomly matched class two or better combinations because of the tolerances in thread dimensions which result from the wear of the thread forming apparatus over the useful life thereof. As will be known to those skilled in the art, these tolerances are established by national organizations and must be adhered to by responsible fastener manufacturers in order to do business on a practical level.

For example, there is the so-called Dardelet thread in which helical flats are formed at the crest of one element and the mating valley of the other element, the flats being formed so as to lie at a shallow angle of less than 13°, preferably 6°, known as the "angle of friction." The theory of the Dardelet thread is to the effect that the telescopic frictional engagement of these two flats under tensioned fastener conditions will produce sufficient friction to resist the unlocking rotation which would de-tension the fastener combination. As a practical matter, the angle of the flats are so shallow that the variations in radial dimension which are generally permitted under prevailing manufacturing standards would produce an unacceptable percentage of male/female fastener matches in which no engagement of the flats whatsoever would occur. For tight match-ups the Dardelet threadform is very difficult to turn to full tension and is practically impossible to remove and reuse. In brief, the theory of the Dardelet thread is interesting but not practical in mass production.

A fastener which has been found to be practical in mass production and to achieve my objective of radially immobilizing the male and female fastener elements so that vibration does not initiate detensioning rotation therebetween is shown in my U.S. Pat. No. 4,171,012 "Locking Thread Construction," granted Oct. 16, 1979. In that patent I disclose a nonstandard threadform having a relatively steeply angled helical ramp on one element which is engaged by the crest of the mating thread when fusioned to produce the locking effect.

SUMMARY OF THE INVENTION

An onverall objective of the present invention is to provide a threadform for a male fastener element, such as a bolt, which is readily manufacturable using conventional equipment and techniques; e.g., thread rolling dies, whcih produces a self-locking function through immobilization of the mated fastener elements but which exhibits relatively low on-torque and is, therefore, readily assembled in application.

In general my invention comprises an external threadform which provides interference with standard internal threadforms thereby to immobilize the combination to prevent loosening under conditions of vibration. The threadform of my invention is characterized by an asymmetric flank angle design wherein the trailing flank lies at a greater angle than the leading flank and wherein the valleys defined by the threadform flanks, over at least part of the working length of the fastener element, include an elevated portion which lies substantially above the nominal valley depth and, immediately adjacent thereto, a depressed portion which may lie at or below the nominal valley depth. In practice the elevated portion of the valley is sufficiently high as to ensure interfering engagement with the crest of even the smallest within-tolerance standard nut thread thereby to provide a locking action. The depressed portion, together with the steeper than standard flank angle, provides volume to receive the deformed metal so that the fastener of my invention also functions properly even when randomly matched components achieving a class two fit make up the combination. More specifically, the elevated portion is formed in a manner such that the depressed portion is completely filled by the deformed metal to ensure the most secure locking action possible.

In the following specification I describe an illustrative embodiment of my invention which accomplishes the foregoing objectives and conforms to the foregoing description.

DETAILED DESCRIPTION OF THE ILLUSTRATIVE EMBODIMENT

Figure 1:
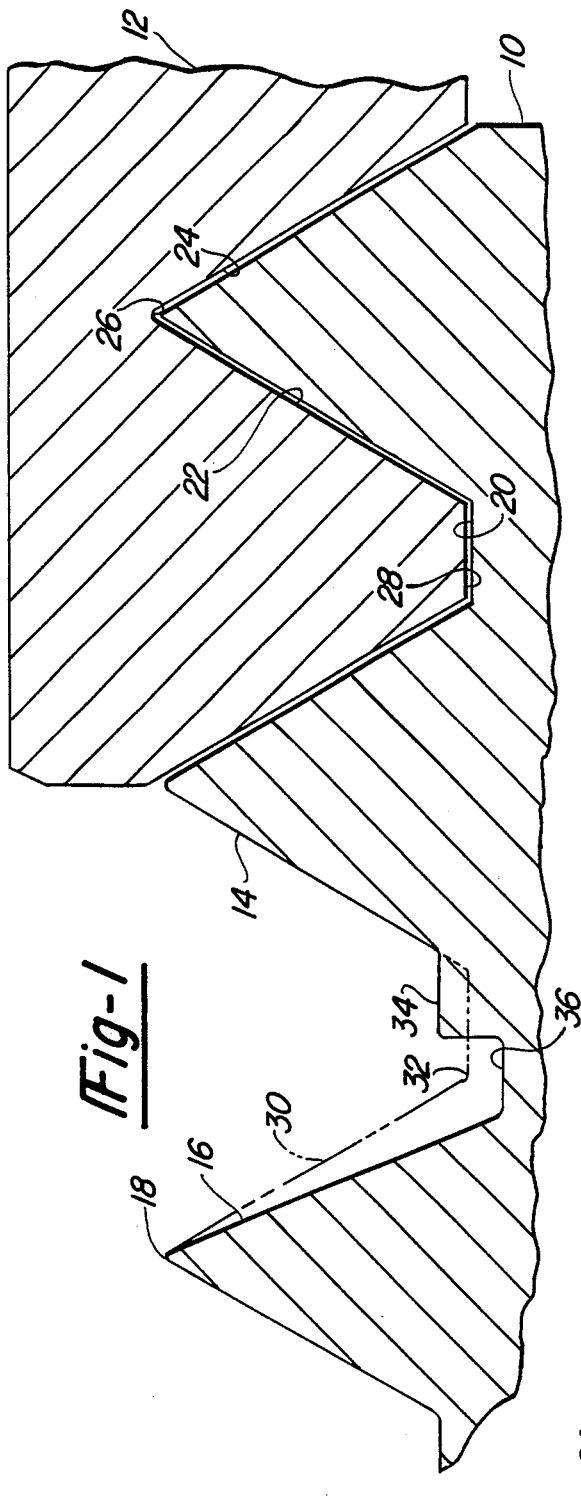
FIG. 1 is a cross-sectional view of a portion of a male fastener exhibiting my inventive threadform and in combination with a standard female element such as a nut.

Referring to FIG. 1 a fastener combination embodying my invention is shown to comprise a male fastener element 10 which may be a bolt or a stud or a structural element which is susceptible of having a threadform impressed on an external surface thereof. The combination further comprises a female threadform element 12 such as a nut or an insert or a tapped hole in a structural element or component of a larger combination. The male element 10 is typically provided with a head (not shown) which permits it to be turned about its own longitudinal axis of rotational symmetry A and it will be appreciated that the head or turning portion of the male element 10 is to the left as viewed in FIG. 1.

The threadform of the male element 10 comprises a helical leading flank 14 which in the illustrative embodiment is disposed at an S.A.E. standard angle of 30° and a trailing flank 16 which lies at a steeper than standard angle of approximately 22½°, both angles being measured from a radius through crest 18. The flanks 14 and 16 converge to form crests 18 of constant height throughout the working portion of the male threadform and valleys 20 which are nonstandard as hereinafter described in greater detail.

The female fastener 12 is formed such as by tapping to provide a leading flank 22 and a trailing flank 24, both lying at the S.A.E. standard angles of 30°. The flanks 22 and 24 converge to form valleys 26 and crests 28 represented in idealized fashion in the drawing for clarity; i.e., normal thread forming does not produce the sharp corners shown.

It is to be understood that the term "leading flank" as used herein refers to the flank 14 which substantially faces the head or turning end of the male fastener and the term "trailing flank" as used herein refers to the opposite flank. These are not terms-of-art, and are arbitrarily chosen for convenience. When the fastener combination is tightened, the leading flanks 14 and 22 converge on one another and generally come into solid flank-to-flank contact whereas the trailing flanks 16 and 24 tend to separate from one another. Note that in the embodiment of the present invention, the trailing flanks 16 and 24 of elements 10 and 12, respectively, lie at different angles and hence produce a substantial gap or volume therebetween even before the fastener combination is tensioned.

In the embodiment of FIG. 1 a standard threadform is used for the first turn of the bolt 10 to facilitate starting it in nut 12; i.e., the crest 28 of the female 12 and the valley 20 of the male 10 do not interfere for the first turn of the combination. Moreover the outline 30 of the standard female thread is continued to the left of the element 12 to establish a reference. In particular, the vallye portion 32 of the outline is drawn in to illustrate the location of a nominal thread depth which is essentially maintained over the length of the male element 10; i.e., this nominal outline is immediately adjacent the average minimum bolt diameter which would be established if the fastener element 10 were to be rolled to standard design rather than the modified design hereinafter described.

The second and all succeeding threads of the male element 10 are shown in FIG. 1 to be rolled and thereby formed to a nonstandard configuration. In this nonstandard configuration an elevated portion 34 of the valley is provided adjacent the flank 14, which elevated portion 34 has substantially greater diameter than the nominal depth 32; i.e., elevated portion 34 lies above the nominal thread depth 32. Immediately adjacent the elevated portion 34, there is formed a depressed or deepened portion 36 which, in the illustrated embodiment, lies below the nominal thread depth 32. It is not essential, however, that portion 36 be below the nominal bolt thread depth line to achieve locking in a class two fit situation. The elevated portion 34 is sufficiently high as to ensure interfering contact with the crest 28 of a nut of maximum internal diameter; i.e., a nut manufactured immediately after the installation of fresh, sharp taps in the nut making machine. The position of elevated portion 34 on the leading flank 14 ensures that as interfering contact with crest 28 of the nut occurs, the deformed metal will completely fill depressed portion 36 (see FIG. 2). This has the advantage of leaving all of crest 28 in frictional engagement with deformed metal to create the most secure possible locking action between elements 10 and 12. Moreover the depressed or deepened portion 36 of the valley is sufficiently deep as to avoid contact with even the smallest internal diameter nut thread form in a class two fit thereby to provide sufficient room for material removed from the elevated portion 34 during the threading operation.

Figure 2:
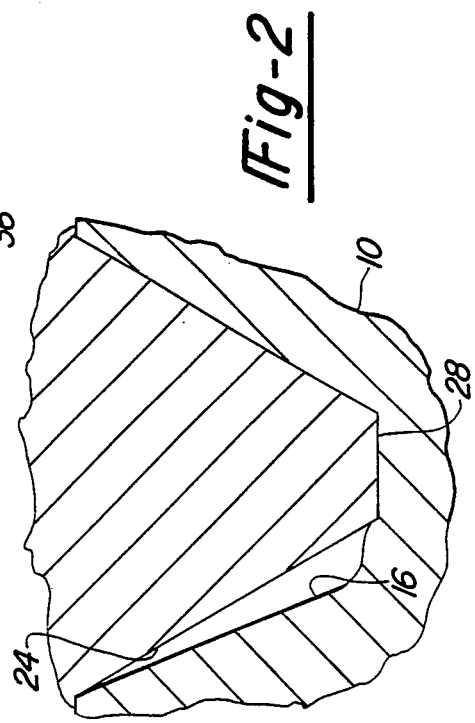
FIG. 2 is an enlarged sectional view of male and female fastener components in engagement according to the principles of my invention.

FIG. 2 shows the result of threading the elements 10 and 12 together in the fully assembled and tensioned condition. It can be seen that a substantial portion of the elevated portion 34 of the bolt valley has been moved by deformation into the trough or volume between the nut crest 28 and the bolt valley such that none of the depression 36 remains. The gap between the steep flank 16 of the bolt and the shallow flank 24 of the nut also receives a portion of the deformed bolt material.

I have found that when a male/female fastener combination utilizing the threadform described herein is assembled using random matched combinations of male and female fastener elements, good and effective locking action occurs in virtually every case. Moreover, the assembly torque which is required to assemble the fastener combination is substantially decreased relative to my previous invention.

I claim:

1. A threaded fastener having a non-standard external threadform thereon for engagement with a standard female thread form to form a prevailing torque fastener combination comprising:

an elongated body having a longitudinal axis of rotation;

a threadform on said body defining leading and trailing helical flanks which intersect to define crests and valleys;

the leading flank lying at a standard angle which matches the angle of the standard female threadform, the trailing flank lying at a steeper angle than the leading flank to produce a gap when threaded together with a standard female threadform, the threadform on said body throughout its length defining a standard and uniform crest diameter and a nominal valley diameter which noninterferingly mates with the crests of said standard female threadforms, the valley over at least a portion of said body being formed as a step to define an elevated portion of greater than nominal diameter immediately adjacent said leading flank which interferes with the crests of said standard female threadforms and which is adapted to be deformed by said standard female threadforms so as to permit threading of male and female components, and a depressed portion of a diameter approximately equal to or less than the nominal diameter immediately adjacent said trailing flank.

2. A threaded fastener as described in claim 1 wherein the angle of the trailing flank is approximately 7½° greater than the angle of the leading flank.

3. A threaded fastener as defined in claim 1 wherein the physical association of said depressed portion and said elevated portion forms a single step in said valley.

4. A prevailing torque fastener combination comprising:

(A) a female member having a helical threadform of standard pitch and 30° flank angle throughout its length;

the threadform on said female member defining leading and trailing flanks which intersect to define uniform crest and valley diameters;

(B) a male member of nominal diameter having an elongated body with a longitudinal axis of symmetry and a pitch which is matingly threadable with said female member;

a threadform on said body defining leading and trailing helical flanks which intersect to define crests and valleys;

the leading flank lying at a standard angle which matches the angle of the leading flank of said female threadform, the trailing flank lying at a steeper angle than the leading flank to produce a gap when threaded together with said standard female member;

the threadform on said male body throughout its length defining a standard and uniform crest diameter and a nominal valley diameter which noninterferingly mates with the crests of said standard female threadforms, the valley of said body having a step configuration defining an elevated portion of greater than nominal diameter immediately adjacent the leading flank, and a depressed portion of a diameter approximately equal to or less than the nominal diameter immediately adjacent said elevated portion;

whereby the elevated portion of said valley interferingly mates with said standard female crests upon assembly of said male and female members resulting in deformation of the elevated portion thereby providing a prevailing torque action of said male and female members irrespective of axial tension on the assembly;

the depressed portion, together with said gap produced by the mated trailing flanks of the male and female members provide sufficient volume to receive said deformation of the elevated portion.

* * * * *